E. SCHNEIDER.
REGULATING DEVICE FOR HYDRAULIC TRANSMISSION.
APPLICATION FILED NOV. 29, 1911.

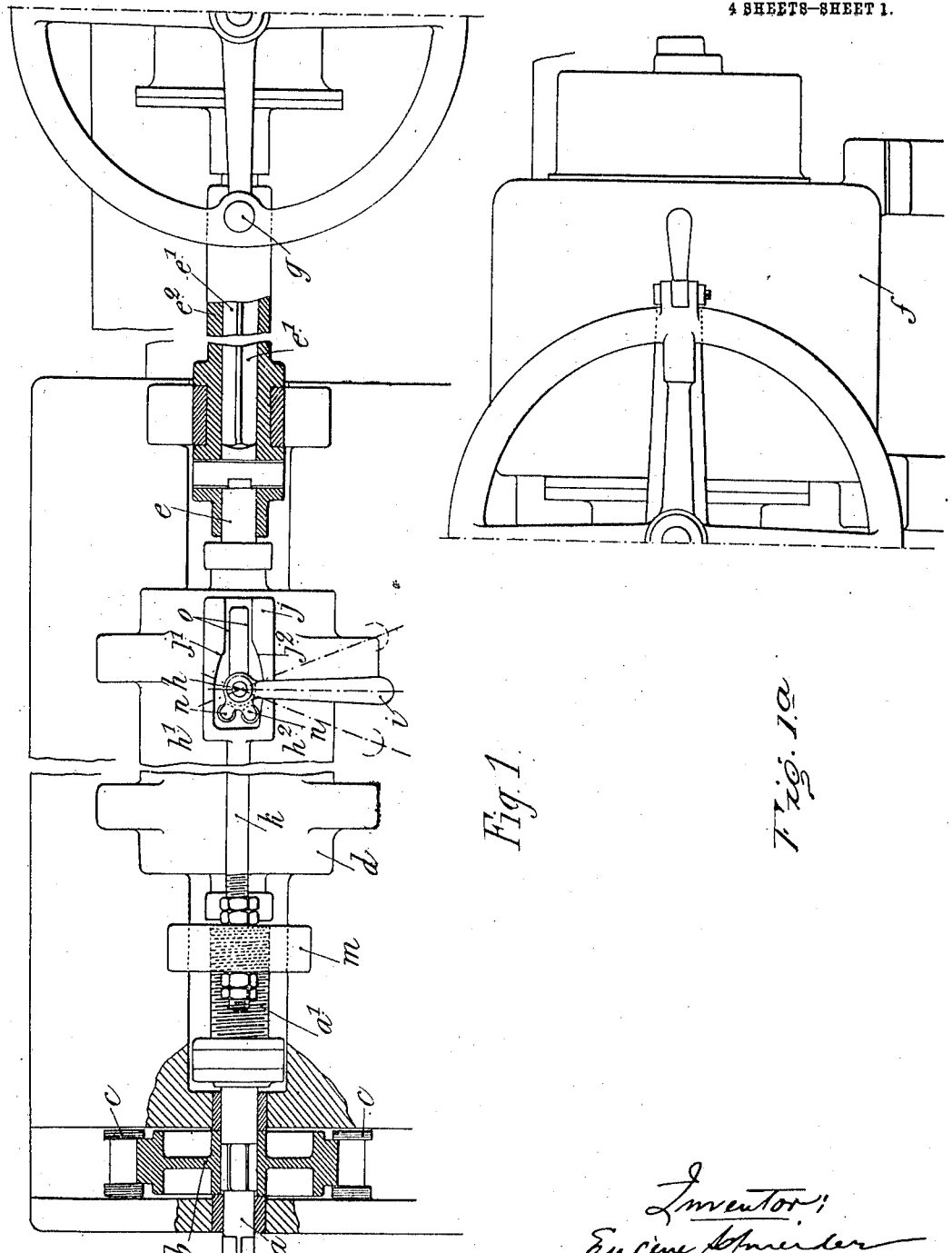

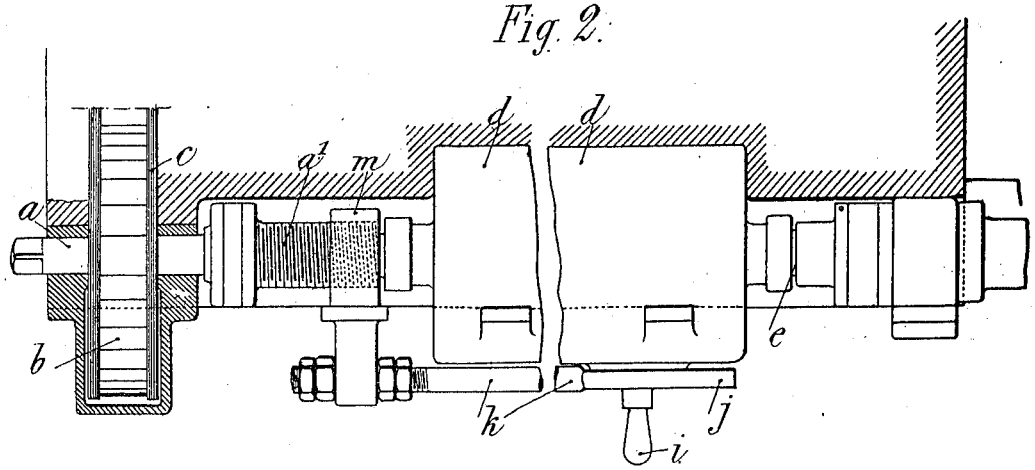
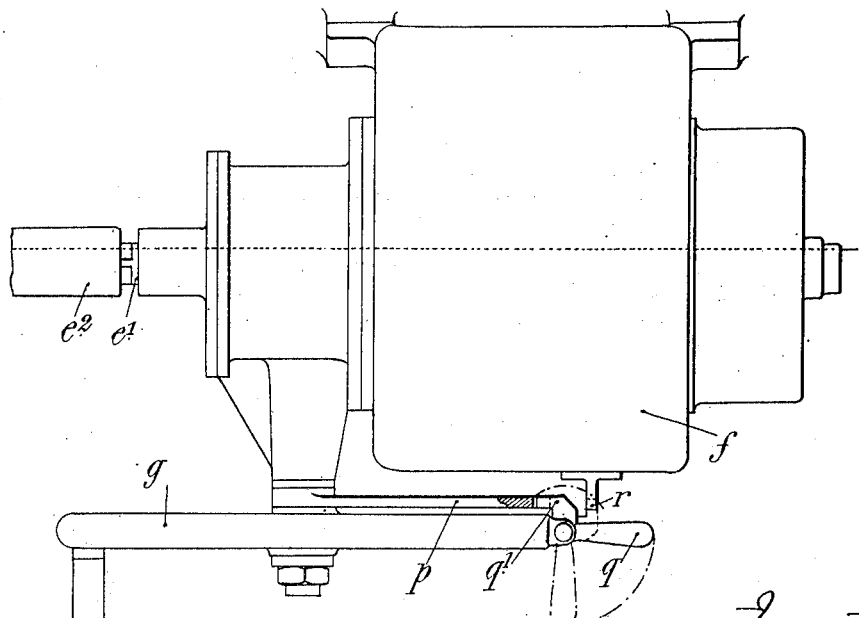

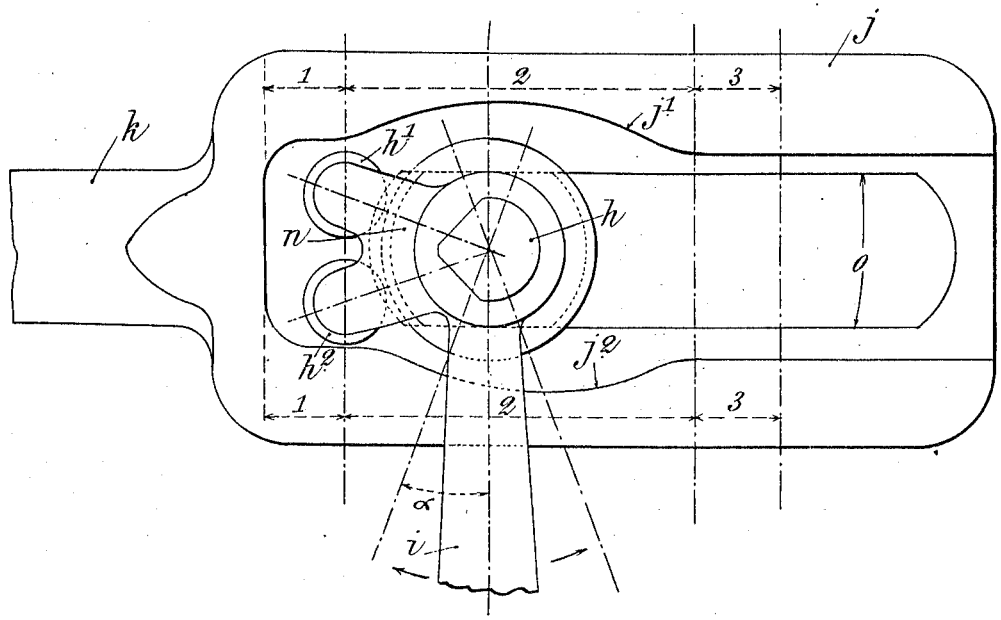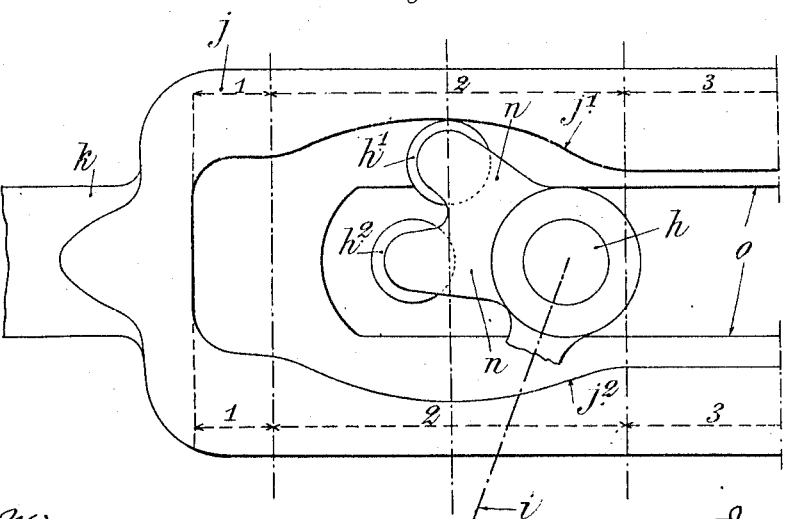

1,040,430.

Patented Oct. 8, 1912.

4 SHEETS—SHEET 4.

UNITED STATES PATENT OFFICE.

EUGÈNE SCHNEIDER, OF LE CREUZOT, FRANCE.

REGULATING DEVICE FOR HYDRAULIC TRANSMISSION.

1,040,430.  Specification of Letters Patent.  Patented Oct. 8, 1912.

Application filed November 29, 1911. Serial No. 663,034.

*To all whom it may concern:*

Be it known that I, EUGÈNE SCHNEIDER, a citizen of the Republic of France, residing at Le Creuzot, Saône-et-Loire, France, have invented a new and useful Regulating Device for Hydraulic Transmission, which is fully set forth in the following specification.

The present invention has for its object a device permitting of the application of a change speed hydraulic transmission to the control of parts such as the breeches of guns and other parts subjected to definite operative conditions first in one direction and then in the other.

For operating the breech for example, in order to render incorrect operations impossible it is indispensable to create a positive connection between the breech and the transmission. Thus throughout the entire duration of the opening movement it is essential to render accidental reversal impossible or even excessive acceleration of the movement. Inversely during the closing movements it is also necessary to render accidental reversal and sudden stoppage at the end of the travel impossible.

The invention permits of realizing these conditions by means of a simple device combined with the usual regulator for the speed and for the direction of movement in hydraulic transmissions.

The invention consists broadly in connecting the part to be controlled (the breech for example) with a controlling means which at all times circumscribes the movements of the regulator member of the hydraulic transmission and receiving during the movements of the breech a displacement which is a function of these movements.

A practical embodiment of the invention is represented by way of example in the accompanying drawing as applied to the control of a gun breech.

Figure 4:
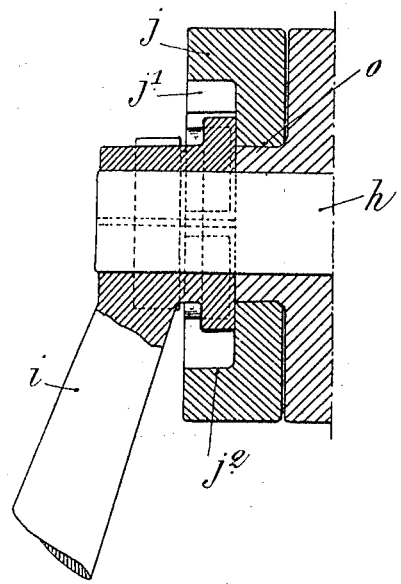
Figure 6:
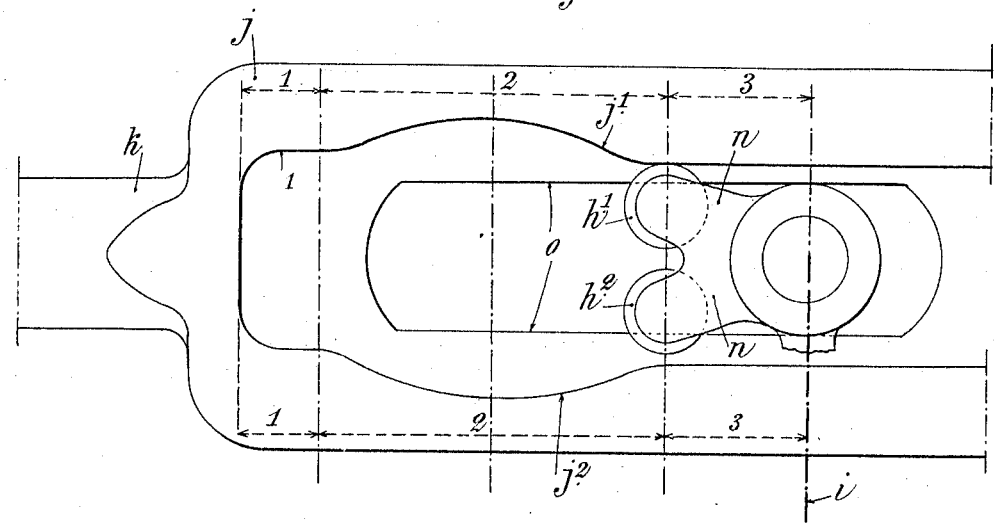

Figures 1 and 1ª show in elevation the installation of a motor and manual operating gear as a whole and comprising between the motor and the breech a change speed hydraulic transmission regulated by the controlling device defined above. Figs. 2 and 2ª are plan views of Figs. 1 and 1ª respectively. Fig. 3 is a detail elevation of the controlling device in a position of repose with the breech closed for example. Fig. 4 is a section on the line A A in Fig. 3. Figs. 5 and 6 are partial elevations of the controlling means in two different positions.

In Figs. 1 and 2 *a* designates a shaft carrying a transmission member such as a toothed wheel *b* connected by an endless chain *c* with another wheel forming part of the operating mechanism for the breech which is not shown. An extension of this shaft enters the envelop *d* of a known change speed hydraulic transmission device; *e* is the driving shaft of this transmission, that is to say, the shaft operated by the source of energy. In the example illustrated it has been assumed that the shaft *e* is driven by an electric motor *f* and that it can also be operated by means of a hand wheel *g*.

As is known change speed hydraulic transmissions comprise a regulating member which is operated by hand in order to give it the proper position corresponding to the direction of movement and to the speed that it is desired to transmit to the part to be controlled. Upon a shaft *h* integral with this part or suitably connected with the latter there is keyed a lever *i* for operating the regulating part. The controlling means which circumscribes and limits the movement of this operating part is constituted by a slide-block *j* carried by a rod *k* the free extremity of which itself carries a nut *m* movable upon a threaded portion *a'* of the shaft *a* which receives the movement furnished by the hydraulic transmission. It will at once be seen that a longitudinal displacement of the controlling device corresponds to any movement of the shaft *a* in one direction or the other, the speed of this latter movement being a direct function of that of the shaft *a*. The controlling means *j* is constituted by a recessed plate, the lower longitudinal walls of which form cams respectively for supporting rollers *h'* *h²* carried at the extremity of lateral projections *n* integral with the lever *i*. The plate *j* is formed with a slot *o* affording passage to the shaft *h* and to the hub of the lever *i*. The profile of the cams *j'* and *j²* one of which serves for running in one direction while the other serves for running in the opposite direction is adapted for limiting the speed in conformity with requirements and at the several periods of the operation. Thus assuming that in the normal or inoperative position corresponding to the breech closed the lever *i* is vertical (as shown in Figs. 1, 2 and 3) and supports the shaft $h$ of the regulating member in the stopped position of the shaft $a$ the profiles $j'$ and $j^2$ will be such that at this moment the lower roller $h^2$ bears upon a horizontal raised portion 1 of the cam $j^2$ thereby rendering any downward displacement impossible while the limited interval between the roller $h'$ and the part 1 of the cam $j'$ permits of only a slight upward angular displacement (Fig. 1). It follows that the operator cannot regulate the hydraulic transmission except with a view to opening the breech and this (as desirable on starting) at a low speed thereby rendering great power available for detaching the obturator. The gunner therefore cannot make a mistake in the direction for operating the lever.

The lever $i$ having been displaced toward the left to the extent of the available angle $\alpha$ the motor $f$ in transmitting its movement to the shaft $a$ produces the opening of the breech in perfect conditions as to power and speed. At the same time that it opens the breech the shaft $a$ in rotating causes the nut $m$ to advance toward the left and thus displaces the controlling part $j$ relatively to the rollers $h'$ and $h^2$. The roller $h'$ is then opposite the deep portion 2 of the cam $j'$ so that the gunner by continuing to press upon the lever $i$ increases the angular lift of the latter. The velocity of the hydraulic transmission imparted to the shaft $a$ consequently increases to a maximum which is attained when the roller $h'$ is in contact with the summit of the curve 2 (this is the position shown in Fig. 5). From this moment the displacement of the controlling member $j$ automatically maintains the roller $h'$ and consequently the lever $i$ at the proper inclination without the necessity for any action by the gunner. The speed transmitted to the shaft $a$ decreases progressively from the maximum to zero, stoppage taking place when the roller $h'$ comes into contact with the part 3 of the cam $j'$ (Fig. 6). To sum up, it will be seen that the breech has been progressively opened, the starting having been produced slowly with the necessary power for detaching the obturator; then the speed of opening has increased, again diminishes and brings the breech into its position of complete opening without shock. It will readily be seen that the controlling member $j$ also controls the regulator lever $i$ in the inverse operation, that is to say, for the closing of the breech. At the commencement of this operation the relative positions of the lever $i$ and of the controlling member $j$ are those shown in Fig. 6. It will be seen that the gunner could not then displace the lever in the upward direction; he is therefore obliged to actuate it in the proper direction as indicated by the arrow. The speed of closing will increase progressively until the maximum is attained when the roller $h^2$ is in contact with the summit of the deep portion 2 of the cam $j^2$, whereupon the speed will diminish progressively and become zero when the roller $h^2$ is in contact with the part 1 of the same cam. It will be noted that all shock of closing is thus rendered impossible. It will of course be understood that the cams $j'$ and $j^2$ should be given a form adapted to each particular case. They will vary in accordance with the nature of the mechanism to be controlled and the functions to be effected by this mechanism. Similarly the means for the longitudinal displacement of the controlling member $j$ may also vary, the only condition to be fulfilled being that the total stroke of $j$ shall be produced during the complete rotation of the shaft $a'$. In the example illustrated the hydraulic transmission is assumed to be mounted upon the rear of the gun (the recoiling portion) while the motor is fixed to the cradle (the fixed portion). This arrangement necessitates the employment of two shaft lengths $e'$ $e^2$ adapted to telescope one within the other, $e'$ being the shaft proper of the motor and $e^2$ a sleeve integral with the shaft end $e$ engaged in the envelop $d$ of the hydraulic transmission.

The motor operation may if desired be combined with manual operation. For this purpose it is only necessary to provide a gear wheel or other transmission between the shaft $e'$ and the shaft of a hand wheel $g$. Practically, in order to prevent any rotation of the crank $g$ when the operation is by motor a clutch or locking device of any suitable and well known construction can be arranged between the hand wheel $g$ and a part such as a lever $p$ covered by the hand wheel. Figs. 1ª and 2ª show a cranked latch $q$ $q'$ pivoted to the hand wheel and adapted to engage either in a notch in the lever $p$ or in a staple $r$ provided in a fixed portion of the motor. When an electric motor is used the latch $q$ $q'$ can be utilized for breaking the circuit.

What we claim and desire to secure by Letters Patent of the United States is:—

1. In a regulating device for variable speed transmission means, the combination of variable speed transmission means and means operated by said transmission means for controlling the speed of starting and stopping said transmission means.

2. In a regulating device for variable speed transmission, the combination of variable speed transmission means, a regulator member for the same, and cam means operated by the transmission means for controlling the movement of said regulator member.

3. In a regulating device for variable speed transmission, the combination of variable speed transmission means, a regulator member for the same, a slide block provided with cam surfaces for engaging the regulator member and connections between the transmission means and said block to move said block to control the movement of said regulator member.

4. In a regulating device of variable speed transmission, the combination of variable speed transmission means, a shaft driven by said means, a slide block having a threaded connection with said shaft and provided with a cam having a plurality of speed governing cam surfaces, and a control lever for said transmission means having a stop which is adapted to engage said cam surface as the block moves by action of said shaft to control the movement of said lever and determine the speed of said shaft according to the cam surface engaged.

5. In a regulating device of variable speed transmission, the combination of variable speed transmission means, a shaft driven by said means, a slide block having a threaded connection with said shaft and provided with a cam having two symmetrically disposed cam surfaces presenting contours for effecting variable speeds of said shaft in each direction of its rotation, and a control lever for said transmission means provided with stops adapted to engage one or the other of said cam surfaces to limit the movements of said control lever.

In testimony whereof I have signed this specification in the presence of two subscribing witnesses.

EUGÈNE SCHNEIDER.

Witnesses:
  H. C. COXE,
  R. DE SEVELINGER.

---

Copies of this patent may be obtained for five cents each, by addressing the "Commissioner of Patents, Washington, D. C."